United States Patent
Tsou et al.

(10) Patent No.: US 10,633,526 B2
(45) Date of Patent: *Apr. 28, 2020

(54) PROPYLENE-ALPHA OLEFIN COPOLYMERS AND METHODS FOR MAKING THE SAME

(71) Applicant: ExxonMobil Chemical Patents Inc., Baytown, TX (US)

(72) Inventors: Andy H. Tsou, Houston, TX (US); Alexander I. Norman, Houston, TX (US); John R. Hagadorn, Houston, TX (US); Gabor Kiss, Hampton, NJ (US); Peijun Jiang, League City, TX (US); Sarah J. Mattler, League City, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 175 days.

This patent is subject to a terminal disclaimer.

(21) Appl. No.: 15/651,547

(22) Filed: Jul. 17, 2017

(65) Prior Publication Data

US 2018/0044513 A1    Feb. 15, 2018

Related U.S. Application Data

(60) Provisional application No. 62/375,173, filed on Aug. 15, 2016.

(51) Int. Cl.
| | | |
|---|---|---|
| *C08F 210/06* | (2006.01) | |
| *C08L 23/16* | (2006.01) | |
| *C08L 23/14* | (2006.01) | |
| *C08F 4/659* | (2006.01) | |

(52) U.S. Cl.
CPC ............ *C08L 23/142* (2013.01); *C08L 23/16* (2013.01); *C08F 4/65908* (2013.01); *C08L 2205/025* (2013.01); *C08L 2207/066* (2013.01); *C08L 2314/06* (2013.01)

(58) Field of Classification Search
CPC .. C08L 23/142; C08L 23/18; C08L 2205/025; C08L 2314/06; C08L 2307/068; C08F 4/65908

USPC ........................................................ 525/53
See application file for complete search history.

(56) References Cited

U.S. PATENT DOCUMENTS

| | | | |
|---|---|---|---|
| 6,525,157 B2 | 2/2003 | Cozewith et al. | |
| 7,026,405 B2 | 4/2006 | Cozewith et al. | |
| 7,803,876 B2 | 9/2010 | Yeh et al. | |
| 8,445,620 B2 * | 5/2013 | Tsou ........................ | C08L 23/10 526/126 |
| 9,102,773 B2 | 8/2015 | Hagadorn et al. | |
| 9,522,984 B2 * | 12/2016 | Kaneno .................. | C08J 9/0061 |
| 2004/0024148 A1 | 2/2004 | Meverden | |
| 2009/0105404 A1 * | 4/2009 | van Riel ............. | C08F 290/046 524/528 |
| 2009/0111945 A1 * | 4/2009 | Datta ....................... | C08L 23/10 525/232 |
| 2009/0270545 A1 | 10/2009 | Sahnoune et al. | |
| 2010/0152360 A1 * | 6/2010 | Jiang ....................... | C08L 23/12 524/515 |
| 2011/0301310 A1 | 12/2011 | Hagadorn et al. | |

FOREIGN PATENT DOCUMENTS

| | | |
|---|---|---|
| WO | 2009/026207 | 2/2009 |
| WO | 2016/114914 | 7/2016 |

OTHER PUBLICATIONS

Utracki et al, "3.45. Phase Inversion," Polymer Alloys and Blends, Hanser Publishers, 1989, Chapter 3.4.5, pp. 180-181.
Metelkin et al., Kolloid. Zh., 1984, vol. 46, No. 3, pp. 476-480.

* cited by examiner

*Primary Examiner* — Michael Bernshteyn

(57) ABSTRACT

Provided is a composition having 60 wt % to 95 wt % of a first propylene alpha-olefin copolymer component having a reactivity ratio product of less than 0.75 and a weight average molecular weight of greater than about 450,000 g/mol; and 5 wt % to 40 wt % of a second propylene alpha-olefin copolymer component having a reactivity ratio of greater than 1.5 and a weight average molecular weight of less than about 215,000 g/mol.

4 Claims, No Drawings

PROPYLENE-ALPHA OLEFIN COPOLYMERS AND METHODS FOR MAKING THE SAME

PRIORITY CLAIM

This application claims priority to and benefit of U.S. Ser. No. 62/375,173, filed Aug. 15, 2016 and is incorporated by reference in its entirety.

FIELD

This invention is related to a process to make a propylene-alpha olefin copolymers having a blend of a co-continuous low reactivity ratio product/alternating sequenced propylene-alpha olefin component and a high reactivity ratio product/blocky sequenced propylene-alpha olefin component to produce a copolymer useful for soft, elastic applications.

BACKGROUND

Polyolefin polymers and polymer blends are known for their utility in a wide variety of applications. In particular, many polyolefin polymers, including copolymers of propylene with other alpha-olefins such as ethylene, are well suited for use in applications requiring good stretchability, elasticity, and strength. Such polymers often comprise a blend of two or more propylene copolymers, and may be manufactured by physically blending two or more copolymers, or by reactor blending of the copolymers, or by reactor synthesizing two or more copolymers with a single catalyst having multiple reactive sits or with multiple catalysts.

Many polyolefin blends known in the prior art are formed into pellets for intermediate storage purposes before being shaped into articles such as fibers, films, nonwovens, extruded coatings, and molded articles. Some of these compositions, however, are known to exhibit poor pellet stability over extended periods of time, leading to agglomeration of pellets and resulting in pellet batches that a do not flow/pour well, particularly after storage and shipping under hot climate conditions. Further, the typically low melting points of such known polymer blends often lead to flattening or other deformation of polymer pellets during long-term storage, which also negatively affects the ability of the polymer pellets to be free-flowing. While blending such polyolefin copolymers with higher-crystallinity components has been shown to improve stability properties of the polymer pellets, such pellets lose some of their elasticity and still have a tendency to agglomerate during shipping and long-term storage, thus presenting processing issues where free-flowing pellets are required.

As a result, many known polyolefin blend pellets are blended with approximately 10 wt % of a crystalline random propylene-ethylene copolymer, as disclosed in U.S. Pat. Nos. 7,026,405 and 7,803,876. While the resultant polyolefin are pellet stable, they are generally less elastic with a higher tension set, top load, and hysteresis as compared to the original polyolefin blend pellets without the random copolymer. Accordingly, such products have limited utility in applications where enhanced elasticity is required.

The inventors have discovered that incorporating a low reactivity ratio product/alternating sequenced pyridyl diamido-based catalyzed copolymer with high reactivity ratio product/blocky sequenced metallocene catalyzed copolymer can produce a balance of a pellet stable bimodal propylene-alpha olefin copolymer having suitable elastic recovery properties. In contrast to products prepared with a random propylene-ethylene copolymer, the olefin copolymers of the invention have a broad split in molecular weight of each component but a narrow split in alpha-olefin content of each component.

SUMMARY

In one aspect, provided herein is a composition comprising from about 60 wt % to about 95 wt % of a first propylene alpha-olefin copolymer component having a reactivity ratio product of less than 0.75 and a weight average molecular weight of greater than about 450,000 g/mol; and from about 5 wt % to about 40 wt % of a second propylene alpha-olefin copolymer component having a reactivity ratio product of greater than 1.5 and a weight average molecular weight of less than about 215,000 g/mol.

DETAILED DESCRIPTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and atactic symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

Propylene Alpha-Olefin Copolymers

The propylene alpha-olefin copolymer of the invention comprises a blend of a first propylene alpha-olefin component and a second propylene alpha-olefin component. The first component is present in the amount of about 60 to about 95 wt % of the copolymer and the second component is present in the amount of about 5 to about 40 wt % of the copolymer. The alpha-olefin comonomer units for each component may be derived from ethylene, butene, pentene, hexene, 4-methyl-1-pentene, octene, or decene. In preferred embodiments the comonomer for each component is ethylene. In some embodiments, each of the components consists essentially of propylene and ethylene derived units, or consists only of propylene and ethylene derived units. Some of the embodiments described below are discussed with reference to ethylene as the comonomer, but the embodiments are equally applicable to other copolymers with other higher $\alpha$-olefin comonomers.

The copolymer may include at least about 5 wt %, at least about 7 wt %, at least about 9 wt %, at least about 10 wt %, at least about 12 wt %, at least about 13 wt %, at least about 14 wt %, at least about 15 wt % $\alpha$-olefin-derived units, based upon the total weight of the copolymer. The copolymer may include up to about 30 wt %, up to about 25 wt %, up to about 22 wt %, up to about 20 wt %, up to about 19 wt %, up to about 18 wt % $\alpha$-olefin-derived units, based upon the total weight of the copolymer. In some embodiments, the copolymer may comprise from about 5 to about 30 wt %, from about 6 to about 25 wt %, from about 7 wt % to about 20 wt %, from about 10 to about 19 wt %, from about 12 wt % to about 19 wt %, or from about 15 wt % to about 18 wt % $\alpha$-olefin-derived units, based upon the total weight of the copolymer.

The copolymer may include at least about 70 wt %, at least about 75 wt %, at least about 78 wt %, at least about 80 wt %, at least about 81 wt %, at least about 82 wt % propylene-derived units, based upon the total weight of the copolymer. The copolymer may include up to about 95 wt %, up to about 93 wt %, up to about 91 wt %, up to about 90 wt %, up to about 88 wt %, or up to about 87 wt %, or up to about 86 wt %, or up to about 85 wt % propylene-derived units, based upon the total weight of the copolymer.

The copolymers can be characterized by a melting point (Tm), which can be determined by differential scanning calorimetry (DSC). Using the DSC test method described herein, the melting point is the temperature recorded corresponding to the greatest heat absorption within the range of melting temperature of the sample, when the sample is continuously heated at a programmed rate. When a single melting peak is observed, that peak is deemed to be the "melting point." When multiple peaks are observed (e.g., principle and secondary peaks), then the melting point is deemed to be the highest of those peaks. It is noted that due to the low-crystallinity of many copolymers, the melting point peak may be at a low temperature and be relatively flat, making it difficult to determine the precise peak location. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

As used herein, the "glass transition temperature" (Tg) is measured using dynamic mechanical analysis. This test provides information about the small-strain mechanical response of a sample as a function of temperature over a temperature range that includes the glass transition region and the visco-elastic region prior to melting. Specimens are tested using a commercially available DMA instrument (e.g., TA Instruments DMA 2980 or Rheometrics RSA) equipped with a dual cantilever test fixture. The specimen is cooled to −130° C. then heated to 60° C. at a heating rate of 2° C./min while subjecting to an oscillatory deformation at 0.1% strain and a frequency of 6.3 rad/sec.

The copolymer can have a triad tacticity of three propylene units (mm tacticity), as measured by 13C NMR, of 65% or greater, 70% or greater, 75% or greater, 80% or greater. In one or more embodiments, the triad tacticity may range from about 65% to about 99%, from about 70% to about 99%, from about 75% to about 99%, from about 80% to about 99%. Triad tacticity is determined by the methods described in U.S. Pat. No. 7,232,871.

Propylene crystallinity is probed using X-ray scattering methods. Since polypropylene is a semi-crystalline polymer, the crystal structure can be resolved using X-ray diffraction (XRD) or Wide-Angle X-ray Scattering (WAXS). The unit cells of the crystalline polymer are the building blocks of the crystalline lamellae: planar sheets of crystalline material. Since not all polymer chains can crystallize, amorphous chains also exist and these typically are found in between stacks of crystalline lamellae. WAXS can probe the extent to which these polymer chains crystallize since the data will contain information regarding crystalline and amorphous morphology. WAXS also can determine crystalline orientation and crystallite size. All wide-angle X-ray scattering (WAXS) were performed using an in-house SAXSLAB Ganesha 300XL+. Polymer pellet samples were melt pressed into discs approximately 0.5 mm thick from a melt of 190° C. Samples were cooled in air over 7 days and then placed directly in the path of the incident X-ray beam. The incident wavelength was 0.154 nm from a CuK$\alpha$ microfocus sealed tube source (Xenocs). All samples were collected at sample-to-detector positions of 91 mm and were held in a vacuum to minimize air scatter. The SAXS and WAXS were recorded using a Dectris Pilatus. Sample to detector distance was calibrated using a Silver Behenate standard. A 0-360 integration was performed on the 2D scattering patterns. The Intensities were recorded as a function of scattering vector, q, where q=4$\pi$ sin $\theta$/$\lambda$ ($\theta$ is the scattering angle and $\lambda$ is the incident wavelength) and the scattering vector q is also defined as q=2$\pi$/d where d is a distance in real space: unit cell dimension from WAXS, and inter-lamellae spacing from SAXS. All data were corrected for transmission, background scattering and detector non-linearity.

The crystallinity of the film samples is obtained from WAXS: unit cell type and overall extent of crystallinity. WAXS and SAXS patterns were collapsed to a I(q) vs q plot.

The overall degree of crystallinity of the film samples was determined by taking the ratio of the peak areas of the (110), (040), (130), (111) and (13$\bar{1}$) (which were fit to a Gaussian function) to the total area underneath the 1D WAXS profile [1]. The amorphous region was also fit to a Gaussian curve. See Ryan, A. J., et al., *A synchrotron X-ray study of melting and recrystallization in isotactic polypropylene*. Polymer, 1997, 38(4): p. 759-768.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in $g/cm^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient. P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the following equation:

$$\eta_S = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ defined as;

$$g'vis = \frac{[\eta]_{avg}}{k M_v^\alpha}.$$

$M_v$ is the viscosity-average molecular weight based on molecular weights determined by LS analysis. Z average branching index ($g'_{z_{ave}}$) is calculated using Ci=polymer concentration in the slice i in the polymer peak times the mass of the slice squared, $Mi^2$.

All molecular weights are weight average unless otherwise noted. All molecular weights are reported in g/mol unless otherwise noted. Branching Index. The ethylene elastomers described herein preferably having a branching index of greater than about 0.5. The relative degree of branching in the propylene alpha-olefin is determined using a branching index factor (BI). Calculating this factor requires a series of three laboratory measurements of polymer properties in solutions as disclosed in VerStrate, Gary, "Ethylene-Propylene Elastomers", Encyclopedia of Polymer Science and Engineering, 6, 2nd edition (1986). These are: (i) Mw, GPC LALLS, weight average molecular weight measured using a low angle laser light scattering (LALLS) technique in combination with Gel Permeation Chromatography (GPC) (ii) weight average molecular weight (Mw-DRI) and viscosity average molecular weight (MvDRI) using a differential refractive index (DRI) detector in combination with GPC and (iii) intrinsic viscosity (IV) measured in decalin at 135° C. The first two measurements (i and ii) are obtained in a GPC using a filtered dilute solution of the polymer in trichlorobenzene.

In embodiments, the weight average molecular weight of the first polymer component is greater than that of the second polymer component. Preferably, the weight average molecular weight of the first polymer component is greater than about 400,000 g/mol, or about 450,000 g/mol, or about 500,000 g/mol. Preferably, the weight average molecular weight of the second polymer component is less than about 300,000 g/mol, or about 250,000 g/mol, or about 215,000 g/mol.

The copolymer may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The copolymer may have an MFR less than about 25 g/10 min, less than about 15 g/10 min, less than about 10 g/10 min, less than about 7 g/10 min, or less than about 5 g/10 min. In some embodiments, the copolymer may have an MFR from about 0.5 to about 10 g/10 min, from about 1.0 to about 7 g/10 min, or from about 1.5 to about 5 g/10 min, where desirable ranges may include ranges from any lower limit to any upper limit.

In preferred embodiments, the copolymer is a reactor grade or reactor blended polymer, as defined above. That is, in preferred embodiments, the copolymer is a reactor blend of a first polymer component and a second polymer component. Thus, the comonomer content of the copolymer can be adjusted by adjusting the comonomer content of the first polymer component, adjusting the comonomer content of second polymer component, and/or adjusting the ratio of the first polymer component to the second polymer component present in the copolymer.

In embodiments where the copolymer is a reactor blended polymer, the α-olefin content of the first polymer component ("$R_1$") may be greater than 5 wt %, greater than 7 wt %, greater than 10 wt %, greater than 12 wt %, greater than 15 wt % based upon the total weight of the first polymer component. The α-olefin content of the first polymer component may be less than 30 wt %, less than 27 wt %, less than 25 wt %, less than 22 wt %, less than 20 wt %, or less than 19 wt %, based upon the total weight of the first polymer component. In some embodiments, the α-olefin content of the first polymer component may range from 5 wt % to 30 wt %, from 7 wt % to 27 wt %, from 10 wt % to 25 wt %, from 12 wt % to 22 wt %, from 15 wt % to 20 wt %, or from 15 wt % to 19 wt %. Preferably, the first polymer component comprises propylene and ethylene derived units, or consists essentially of propylene and ethylene derived units.

In embodiments where the copolymer is a reactor blended polymer, the α-olefin content of the second polymer component ("$R_2$") may be greater than 5 wt %, greater than 7 wt %, greater than 10 wt %, greater than 12 wt %, greater than 15 wt %, α-olefin, based upon the total weight of the second polymer component. The α-olefin content of the second polymer component may be less than 30 wt %, less than 27 wt %, less than 25 wt %, less than 22 wt %, less than 20 wt %, or less than 19 wt %, based upon the total weight of the second polymer component. In some embodiments, the α-olefin content of the second polymer component may range from 5 wt % to 30 wt %, or from 7 wt % to 27 wt %, or from 10 wt % to 25 wt %, or from 12 wt % to 22 wt %, or from 15 wt % to 20 wt %, or from 15 wt % to 19 wt %. Preferably, the second polymer component comprises propylene and ethylene derived units, or consists essentially of propylene and ethylene derived units.

In embodiments, the difference between the α-olefin of the first polymer component and that of the second polymer component is less than about 15 wt %, preferably less than about 10 wt %, and most preferably less than about 5 wt %.

In embodiments where the copolymer is a reactor blended polymer, the copolymer may comprise from 3 wt % to 45 wt % of the second polymer component, from 5 wt % to 40 wt % of the second polymer component, from 7.5 wt % to 35 wt % of the second polymer component, based on the weight of the copolymer, where desirable ranges may include ranges from any lower limit to any upper limit. The copolymer may comprise from 55 wt % to 97 wt % of the first polymer component, from 60 wt % to 95 wt % of the first polymer component, from 65 wt % to 92.5 wt % of the first polymer component, based on the weight of the copolymer, where desirable ranges may include ranges from any lower limit to any upper limit.

Copolymerization of monomer M1 and monomer M2 leads to two types of polymer chains—one with monomer M1 at the propagating chain end (M1*) and other with monomer M2 (M2*). Four propagation reactions are then possible. Monomer M1 and monomer M2 can each add either to a propagating chain ending in monomer M1 or to one ending in monomer M2, i.e.,

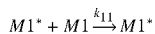
$$M1^* + M1 \xrightarrow{k_{11}} M1^*$$

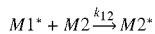
$$M1^* + M2 \xrightarrow{k_{12}} M2^*$$

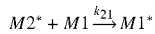
$$M2^* + M1 \xrightarrow{k_{21}} M1^*$$

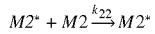
$$M2^* + M2 \xrightarrow{k_{22}} M2^*$$

where $k_{11}$ is the rate constant for inserting M1 to a propagating chain ending in M1 (i.e. M1*), $k_{12}$ is the rate constant for inserting M2 to a propagating chain ending in M1 (i.e., M1*), and so on. The monomer reactivity ratio $r_1$ and $r_2$ are defined as $$r_1 = \frac{k_{11}}{k_{12}}; r_2 = \frac{k_{22}}{k_{21}}$$

$r_1$ and $r_2$ as defined above is the ratio of the rate constant for a reactive propagating species adding its own type of monomer to the rate constant for its addition of the other monomer. The tendency of two monomers to copolymerize is noted by values of $r_1$ and $r_2$. An $r_1$ value greater than unity means that M1* preferentially inserts M1 instead of M2, while an $r_1$ value less than unity means that M1* preferentially inserts M2. An $r_1$ value of zero would mean that M1 is incapable of undergoing homopolymerization.

The preferential insertions of two monomers in the copolymerization lead to three distinguish polymer chain structures. When the two monomers are arranged in an alternating fashion, the polymer is called an alternating copolymer:
—M1-M2-M1-M2-M1-M2-M1-M2-M1-M2-M1-M2-M1-M2—.

In a random copolymer, the two monomers are inserted in a random order:
—M1-M1-M2-M1-M2-M2-M1-M2-M1-M1-M2-M2-M2-M1—.

In a block copolymer, one type of monomer is grouped together in a chain segment, and another one is grouped together in another chain segments. A block copolymer can be thought of as a polymers with multiple chain segments with each segment consisting of the same type of monomer:
—M2-M2-M2-M2-M1-M1-M1-M2-M2-M2-M1-M1-M1-M1—.

The classification of the three types of copolymers can be also reflected in the reactivity ratio product, $r_1r_2$. As is known to those skilled in the art, when $r_1r_2=1$, the polymerization is called ideal copolymerization. Ideal copolymerization occurs when the two types of propagating chains M1* and M2* show the same preference for inserting M1 or M2 monomer. The copolymer is "statistically random." For the case, where the two monomer reactivity ratios are different, for example, $r_1>1$ and $r_2<1$ or $r_1<1$ and $r_2>1$, one of the monomers is more reactive than the other toward both propagating chains. The copolymer will contain a larger proportion of the more reactive monomer in random placement.

When both $r_1$ and $r_2$ are greater than unity (and therefore, also $r_1r_2>1$), there is a tendency to form a block copolymer in which there are blocks of both monomers in the chain. For the special case of $r_1>>r_2$ (i.e. $r_1>>1$ and $r_2<<1$), both types of propagating chains preferentially add to monomer M1. There is a tendency toward "consecutive homopolymerization" of the two monomers to form block copolymer. A copolymer having reactivity product, $r_1r_2$, greater than 1.5 contains relatively long homopolymer sequences and is said to be "blocky."

The two monomers enter into the copolymer in equimolar amounts in a nonrandom, alternating arrangement along the copolymer chain when $r_1r_2=0$. This type of copolymerization is referred to as alternating copolymerization. Each of the two types of propagating chains preferentially adds to the other monomer, that is, M1 adds only to M2* and M2 adds only to M1*. The copolymer has the alternating structure irrespective of the comonomer feed composition.

The behavior of most copolymer systems lies between the two extremes of ideal and alternating copolymerization. As the $r_1r_2$ product decreases from unity toward zero, there is an increasing tendency toward alternation. Perfect alternation will occur when $r_1$ and $r_2$ become progressively less than unity. In other words, a copolymer having a reactivity ratio product $r_1r_2$ of between 7.5 and 1.5 is generally said to be random. When $r_1r_2>1.5$ the copolymer is said to be "blocky." The first propylene alpha-olefin component of the invention has a reactivity ratio of less than 0.75 and is therefore considered "alternating". The second propylene alpha-olefin component of the invention has a reactivity ratio of greater than 1.5 and is therefore considered "blocky."

The reactivity ratio product is described more fully in Textbook of Polymer Chemistry, F. W. Billmeyer, Jr., Interscience Publishers, New York, p. 221 et seq. (1957). For a copolymer of ethylene and propylene, the reactivity ratio product $r_1r_2$, where $r_1$ is the reactivity ratio of ethylene and $r_2$ is the reactivity ratio of propylene, can be calculated from the measured diad distribution (PP, EE, EP and PE in this nomenclature) by the application of the following formulae: $r_1r_2=4$ (EE)(PP)/(EP)$^2$.

The copolymers are preferably prepared using homogeneous conditions, such as a continuous solution polymerization process. In some embodiments, the copolymer are prepared in parallel solution polymerization reactors, such that the first reactor component is prepared in a first reactor and the second reactor component is prepared in a second reactor, and the reactor effluent from the first and second reactors are combined and blended to form a single reactor effluent from which the final copolymer is separated. Exemplary methods for the preparation of copolymers may be found in U.S. Pat. Nos. 6,881,800; 7,803,876; 8,013,069; and 8,026,323 and PCT Publications WO 2011/087729; WO 2011/087730; and WO 2011/087731, incorporated herein by reference. Alternatively, one can use a single reactor with two catalysts, one to make first component and the other to make second component since both components are of similar compositions. Reaction temperature can be adjusted to deliver the final molecular weights for both components.

Preferably, the first reactor component of the copolymer is polymerized using a non-metallocene catalyst and the second reactor component of the copolymer is polymerized using a metallocene catalyst. The term "non-metallocene catalyst", also known as "post-metallocene catalyst" describe transition metal complexes that do not feature any pi-coordinated cyclopentadienyl anion donors (or the like) and are useful the polymerization of olefins when combined with common activators. See Baier, M. C.; Zuideveld, M. A.; Mecking, S. Angew. Chem. Int. Ed. 2014, 53, 2-25; Gibson, V. C., Spitzmesser, S. K. Chem. Rev. 2003, 103, 283-315; Britovsek, G. J. P., Gibson, V. C., Wass, D. F. Angew. Chem. Int. Ed. 1999, 38, 428-447; Diamond, G. M. et al. ACS Catal. 2011, 1, 887-900; Sakuma, A., Weiser, M. S., Fujita, T. Polymer J. 2007, 39:3, 193-207. See also U.S. Pat. Nos. 6,841,502, 7,256,296, 7,018,949, 7,964,681.

Preferably, the first reactor component of the copolymer is a pyridyl diamide catalyzed and the second reactor component of the copolymer is metallocene catalyzed. The pyridyl diamide catalyst has the following structural formula:

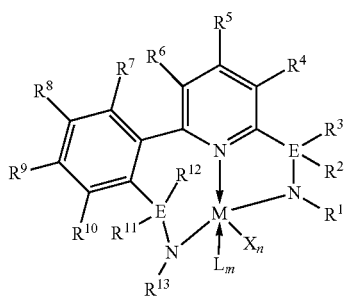

wherein M is a Group 3-12 metal; E is selected from carbon, silicon, or germanium; X is an anionic leaving group, such as, but not limited to alkyl, aryl, hydride, alkylsilane, fluoride, chloride, bromide, iodide, triflate, carboxylate, alkylsulfonate, amide, alkoxide, and hydroxide; L is a neutral Lewis base, such as, but not limited to ether, amine, thioether; $R^1$ and $R^{13}$ are independently selected from the group consisting of hydrocarbyls, substituted hydrocarbyls, and silyl groups; $R^2$ through $R^{12}$ are independently selected from the group consisting of hydrogen, hydrocarbyls, alkoxy, silyl, amino, aryloxy, substituted hydrocarbyls, halogen, and phosphino; n is 1 or 2 or 3; m is 0, 1, or 2; and two X groups may be joined together to form a dianionic group; two L groups may be joined together to form a bidentate Lewis base; an X group may be joined to an L group to form a monoanionic bidentate group; any two adjacent R groups (e.g. $R^7$ & $R^8$, $R^{10}$ & $R^{11}$, etc.) may be joined to form a substituted or unsubstituted hydrocarbyl or heterocyclic ring, where the ring has 5, 6, 7, or 8 ring atoms and where substitutions on the ring can join to form additional rings; (preferably an aromatic ring, a six membered aromatic ring with the joined $R^7R^8$ group being —CH═CHCH═CH—); $R^{10}$ and $R^{11}$ may be joined to form a ring (preferably a five membered ring with the joined $R^{10}R^{11}$ group being —CH$_2$CH$_2$—, a six membered ring with the joined $R^{10}R^{11}$ group being —CH$_2$CH$_2$CH$_2$—).

Preferably, M is a Group 4 metal, such as zirconium or hafnium. Preferably, n is 2 and m is 0; Preferably, E is carbon. Preferred X groups include chloride, fluoride, methyl, ethyl, propyl, butyl, isobutyl, benzyl, hydrido, dialkylamido, dimethylamido, diethylamido, trimethylsilylmethyl, and neopentyl. Preferred R1 groups include aryls, substituted aryls, 2,6-disubstituted aryls, 2,4,6-trisubstituted aryls, 2,6-diisopropylphenyl, 2,4,6-triisopropylphenyl, 2,6-diisopropyl-4-methyl-phenyl, xylyl, mesityl, and 2-ethyl-6-isopropylphenyl. Preferred R13 groups include aryls, substituted aryls, 2-substituted aryls, cycloalkyl, cyclohexyl, cyclopentyl, 2,5-disubstituted aryl, 2-methylphenyl, 2-ethylphenyl, 2-isopropylphenyl, phenyl, and 4-methylphenyl. Preferred R2/R3 pairs include H/H, H/aryl, H/2-substituted aryl, H/alkyl, H/phenyl, H/2-methylphenyl, and H/2-isopropylphenyl.

In a preferred embodiment, both $R^7$ and $R^8$ are hydrogen.

In a preferred embodiment, $R^7$ and $R^8$ are joined together to form a six-membered aromatic ring.

In a preferred embodiment, $R^{10}$ and $R^{11}$ are joined together to form a five or six-membered ring.

In a preferred embodiment, $R^{11}$ and $R^{12}$ are both hydrogen.

In a preferred embodiment, $R^1$ and $R^{13}$ may be independently selected from phenyl groups that are variously substituted with between zero to five substituents that include F, Cl, Br, I, CF$_3$, NO$_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

Preferred $R^3$-E-$R^2$ groups and preferred $R^{12}$-E-$R^{11}$ groups include CH$_2$, CMe$_2$, SiMe$_2$, SiEt$_2$, SiPr$_2$, SiBu$_2$, SiPh$_2$, Si(aryl)$_2$, Si(alkyl)$_2$, CH(aryl), CH(Ph), CH(alkyl), and CH(2-isopropylphenyl), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

Useful metallocene compounds include compounds represented by the formula: $T_yCp_mMG_nX_q$ wherein Cp is a cyclopentadienyl group (such as cyclopentadiene, indene or fluorene), which may be substituted or unsubstituted, M is a Group 4 to Group 6 transition metal, for example, titanium, zirconium, hafnium, vanadium, niobium, tantalum, chromium, molybdenum, and tungsten, G is a heteroatom group represented by the formula JR*$_z$, where J is a group 15 or 16 element, preferably N, P, O, or S, and R* is a $C_1$ to $C_{20}$ hydrocarbyl group and z is 1 or 2, T is an optional bridging group that joins a cyclopentadienyl group to either another cyclopentadienyl group or a G group, and y is 0 or 1, each X is, independently, a leaving group, or two X are joined and bound to the metal atom to form a metallocycle ring, or two X are joined to form a chelating ligand, a diene ligand, or an alkylidene ligand; and m=1 or 2, n=0, 1, 2 or 3, q=0, 1, 2, or 3, and the sum of m+n+q is equal to the oxidation state of the transition metal (preferably 2, 3, 4, 5, or 6, preferably 4 or 5, preferably 4).

In a preferred embodiment, M is a Group 4 transition metal (preferably Hf, Ti, and/or Zr). In an embodiment when M is Ti, then m is 1. In another embodiment, when M is Zr or Hf, then m is 2 or 3. In an embodiment when M is Ti, then m is 1 and when M is Zr or Hf, then m is 2. In another embodiment when M is Zr or Hf, y is 1, T is dialkylsilyl, and q is 2.

In a preferred embodiment, each Cp is a cyclopentadiene, indene or fluorene, which may be substituted or unsubstituted, each M is titanium, zirconium, or hafnium, and each X is, independently, a halide, a hydride, an alkyl group, an alkenyl group or an arylalkyl group.

In a preferred embodiment, M is Zr or Hf, n is 0, q is 2, m is 2, and y is 1. In another embodiment M is Zr or Hf, n is 0, q is 2, m is 2, y is 1, and each Cp is a substituted indene. In another embodiment, M is Zr or Hf, n is 0, q is 2, m is 2, y is 1, and each Cp is a 2,4-disubstituted indene with the substituents being $C_1$ to $C_{30}$ hydrocarbyls.

Typically, each G is, independently, a heteroatom group represented by the formula JR*$_z$, where J is a group 15 or 16 element, preferably N, P, O, or S (preferably N or O, preferably N), and R* is a $C_1$ to $C_{20}$ hydrocarbyl group. Typically, a linear branched or cyclic hydrocarbyl group having from one to twenty carbon atoms (such as methyl, ethyl, propyl, butyl, pentyl, hexyl, heptyl, octyl, nonyl, decyl, undecyl, dodecyl, or an isomer thereof, including t-butyl, cyclododecyl, cyclooctyl, and the like) and z is 1 or 2.

In an embodiment, when m is 1, n is preferably 1 and G is a heteroatom group represented by the formula JR*$_z$, where J is a group 15 or 16 element, preferably N, P, O, or S (preferably N or O, preferably N), and R* is a linear branched or cyclic hydrocarbyl group having from one to twenty carbon atoms (such as methyl, ethyl, propyl, butyl, pentyl, hexyl, heptyl, octyl, nonyl, decyl, undecyl, dodecyl, or an isomer thereof, including t-butyl, cyclodecyl, cyclooctyl, and the like) and z is 1 or 2, preferably JR*z is cyclododecyl amido, t-butyl amido, and or 1-adamantyl amido.

In an embodiment, when m is 2 or 3, n is 0.

In an embodiment each X may be, independently, a halide, a hydride, an alkyl group, an alkenyl group, or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a phenyl, methyl, ethyl, propyl, butyl, pentyl, or chloro group.

Typically, each Cp group is, independently, a substituted or unsubstituted cyclopentadiene, a substituted or unsubstituted indene, or a substituted or unsubstituted fluorene.

Independently, each Cp group may be substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combinations thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl, or phenyl groups, and the like, including all their isomers, for example, tertiary butyl, isopropyl, and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethyl-germyl and the like; and disubstituted boron radicals including dimethylboron, for example; and disubstituted pnictogen radicals including dimethylamine, dimethylphosphine, diphenylamine, methylphenylphosphine, chalcogen radicals including methoxy, ethoxy, propoxy, phenoxy, methylsulfide, and ethylsulfide. Non-hydrogen substituents R include the atoms carbon, silicon, boron, aluminum, nitrogen, phosphorus, oxygen, tin, sulfur, germanium, and the like, including olefins such as, but not limited to, olefinically unsaturated substituents including vinyl-terminated ligands, for example, but-3-enyl, prop-2-enyl, hex-5-enyl, and the like. Also, at least two R groups, preferably two adjacent R groups, may be joined to form a ring structure having from 3 to 30 atoms selected from carbon, nitrogen, oxygen, phosphorus, silicon, germanium, aluminum, boron, or a combination thereof.

In an embodiment of the Cp group, the substituent(s) R are, independently, hydrocarbyl groups, heteroatoms, or heteroatom-containing groups, such as methyl, ethyl, propyl, butyl, pentyl, hexyl, heptyl, octyl, nonyl, decyl, undecyl, dodecyl, or an isomer thereof, N, O, S, P, or a $C_1$ to $C_{20}$ hydrocarbyl substituted with an N, O, S, and/or P heteroatom or heteroatom-containing group (typically having up to 12 atoms, including the N, O, S, and P heteroatoms).

Non-limiting examples of Cp groups include cyclopentadienyl ligands, cyclopentaphenanthreneyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine ligands (WO 99/40125), pyrrolyl ligands, pyrazolyl ligands, carbazolyl ligands, borabenzene ligands, and the like, including hydrogenated versions thereof, for example tetrahydroindenyl ligands. In another embodiment, each Cp may, independently comprise one or more heteroatoms, for example, nitrogen, silicon, boron, germanium, sulfur, and phosphorus, in combination with carbon atoms to form an open, acyclic, or preferably a fused, ring or ring system, for example, a heterocyclopentadienyl ancillary ligand.

Preferably, T is present and is a bridging group containing at least one Group 13, 14, 15, or 16 element, in particular boron or a Group 14, 15, or 16 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$ to $C_{20}$ containing hydrocarbyl, substituted hydrocarbyl, halocarbyl, substituted halocarbyl, silylcarbyl or germylcarbyl substituent and, optionally, two or more adjacent R' may join to form a substituted or unsubstituted, saturated, partially unsaturated or aromatic, cyclic or polycyclic substituent. Preferred examples for the bridging group T include $CH_2$, $CH_2CH_2$, $SiMe_2$, $SiPh_2$, SiMePh, $Si(CH_2)_3$, $Si(CH_2)_4$, O, S, NPh, PPh, NMe, PMe, NEt, NPr, NBu, PEt, PPr, $Me_2SiOSiMe_2$, and PBu.

In a preferred embodiment of the invention in any embodiment of any formula described herein, T is represented by the formula $R^a_2J$ or $(R^a_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated, or saturated cyclic, or fused ring system. Preferably, T is a bridging group comprising carbon or silica, such as dialkylsilyl, preferably T is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, $Me_2SiOSiMe_2$, and cyclopentasilylene ($Si(CH_2)_4$).

Preferably, useful metallocene compounds include those compounds represented by the formula (A):

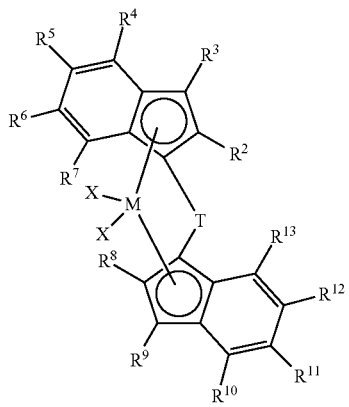

(A)

where:

M is a group 4 metal (preferably Hf, Ti, Zr, preferably Hf or Zr);

T is a bridging group;

X is an anionic leaving group;

each $R^2$, $R^3$, $R^5$, $R^6$, $R^7$, $R^8$, $R^9$, $R^{11}$, $R^{12}$, and $R^{13}$ is independently, halogen atom, hydrogen, a hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR', —OSiR'$_3$, or —PR'$_2$ radical, wherein R' is one of a halogen atom, a $C_1$ to $C_{10}$ alkyl group, or a $C_6$ to $C_{10}$ aryl group, provided that $R^2$ and $R^8$ may not be hydrogen; and $R^4$ and $R^{10}$ are, independently, a substituted or unsubstituted aryl group.

In a preferred embodiment, M may be Hf or Zr; T may be represented by the formula, (R*$_2$G)g, where each G is C, Si, or Ge, g is 1 or 2, and each R* is, independently, hydrogen, halogen, $C_1$ to $C_{20}$ hydrocarbyl or a $C_1$ to $C_{20}$ substituted hydrocarbyl, and two or more R* can form a cyclic structure including aromatic, partially saturated, or saturated cyclic or fused ring system; X may be an anionic leaving group; each $R^3$, $R^5$, $R^6$, $R^7$, $R^9$, $R^{11}$, $R^{12}$, and $R^{13}$ independently may be hydrogen, a hydrocarbyl, substituted hydrocarbyl, halocarbyl, substituted halocarbyl, silylcarbyl, substituted silylcarbyl, germylcarbyl, or substituted germylcarbyl substituents, provided that $R^2$ and $R^8$ are independently a $C_1$ to $C_{20}$ hydrocarbyl group; and $R_4$ and $R_{10}$ are, independently, a substituted or unsubstituted aryl, preferably a substituted or unsubstituted phenyl group.

In one embodiment, M may be Zr or Hf.

In another embodiment, each X independently may be selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In a preferred embodiment of any embodiment of formula (A), each $R^3$, $R^5$, $R^6$, $R^7$, $R^9$, $R^{11}$, $R^{12}$, or $R^{13}$ independently may be hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of any embodiment of formula (A), each $R^3$, $R^4$, $R^5$, $R^6$, $R^7$, $R^9$, $R^{10}$, $R^{11}$, $R^{12}$, or $R^{13}$ independently may be selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiophenyl, fluoro, chloro, bromo, iodo and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiophenyl dimethylcyclopenta[b]thiophenyl.

In a preferred embodiment of any embodiment of formula (A), T may be a bridging group and comprises Si, Ge, or C, preferably T is dialkyl silicon or dialkyl germanium, preferably T is dimethyl silicon.

In a preferred embodiment of any embodiment of formula (A), T may be a bridging group and may be represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C=N—CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$ where each R' is, independently, hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferably, T is CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, cyclopentasilylene (Si(CH$_2$)$_4$), or Si(CH$_2$)$_5$.

In a preferred embodiment of any embodiment of formula (A), each $R^2$ and $R^8$, independently may be a $C_1$ to $C_{20}$ hydrocarbyl, or a $C_1$ to $C_{20}$ substituted hydrocarbyl, $C_1$ to $C_{20}$ halocarbyl, $C_1$ to $C_{20}$ substituted halocarbyl, $C_1$ to $C_{20}$ silylcarbyl, $C_1$ to $C_{20}$ substituted silylcarbyl, $C_1$ to $C_{20}$ germylcarbyl, or $C_1$ to $C_{20}$ substituted germylcarbyl substituents. Preferably, each $R^2$ and $R^8$, is independently, methyl, ethyl, propyl, butyl, pentyl, hexyl, heptyl, octyl, nonyl, decyl, undecyl, docedyl, or an isomer thereof, preferably cyclopropyl, cyclohexyl, (1-cyclohexyl methyl) methyl, isopropyl, and the like.

In a preferred embodiment of any embodiment of formula (A), $R^4$ and $R^{10}$ independently may be a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom-containing group.

Examples of aryl and substituted aryl groups include phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbozyl, naphthyl, and the like.

In a preferred embodiment of any embodiment of formula (A), $R^2$ and $R^8$ may be $C_1$ to $C_{20}$ hydrocarbyl, such as methyl, ethyl, propyl, butyl, pentyl, hexyl, heptyl, octyl, nonyl, decyl, undecyl, docedyl or an isomer thereof, preferably cyclopropyl, cyclohexyl, (1-cyclohexyl methyl) methyl, or isopropyl; and $R^4$ and $R^{10}$ independently may be selected from phenyl, naphthyl, anthraceneyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, cyclopenta[b]thiopheneyl. In a preferred embodiment, $R^2$, $R^8$, $R^4$ and $R^{10}$ are as described in the preceding sentence and $R^3$, $R^5$, $R^6$, $R^7$, $R^9$, $R^{11}$, $R^{12}$, and $R^{13}$ are hydrogen.

Particularly preferred are racemic metallocenes, such as rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl, 4-phenylindenyl)zirconium dichloride, rac dimethylsiladlyl bis-(2-methyl, 4-napthylindenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl] indenyl)$_2$ zirconium dichloride, rac-diphenylsiladiyl(2-methyl-4-[1-naphthyl]indenyl)$_2$ zirconium dichloride and rac-biphenyl siladiyl(2-isopropyl, 4-[3,5 di-t-butyl-phenyl] indenyl)$_2$ zirconium dichloride. Alkylated variants of these metallocenes (e.g. di-methyl instead of dichloride) are also useful, particularly when combined with a non-coordinating anion type activator. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

The activators for these metallocene catalysts can methylaluminoxane (MAO), or a non-coordinating anion activator selected from the group consisting of dimethylanilinium- or trityl-fluoroarylborates, wherein the fluoroaryl group is pentafluorophenyl, perfluoronaphthyl, or quadrafluoro-trihydronaphthyl.

As used in this document, the term "room temperature" is used to refer to the temperature range of about 20° C. to about 23.5° C.

The propylene-alpha olefin copolymer can be made using general polymerization techniques known in the art. Any solution, suspension, slurry and bulk and gas phase polymerization process known in the art can be used. Such processes can be run in batch, semi-batch or continuous mode. Homogeneous solution processes are preferred.

In a typical solution process, catalyst components, solvent, monomers and hydrogen (when used) are fed under pressure to one or more reactors. The temperature of the reactor is controlled by the rate of catalyst addition (rate of polymerization), the temperature of the solvent/monomer feed stream and/or the use of heat transfer systems. For olefin polymerization, reactor temperatures can range from about 60° C. to about 250° C., while pressures are generally higher than 300 psig. In one embodiment, the polymerization temperature is preferably at least 50, or 60, or 70° C., or within a range from 50, or 60, or 70, or 80, or 90, or 100, or 120 to 130, or 140, or 150, or 160, or 170° C.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons. The feedstock may be heated or cooled prior to feeding to the first reactor. Additional monomers and solvent may be added to the second reactor, and it may be heated or cooled. The catalysts/activators can be fed in the first reactor or split between two reactors. In solution polymerization, polymer produced is molten and remains dissolved in the solvent under reactor conditions, forming a polymer solution (also referred as to effluent).

The solution polymerization process of this invention uses stirred reactor system comprising one or more stirred polymerization reactors. Generally the reactors should be operated under conditions to achieve a thorough mixing of the reactants. In a dual reactor system, the first polymerization reactor preferably operates at lower temperature. The residence time in each reactor will depend on the design and the capacity of the reactor. The catalysts/activators can be fed into the first reactor only or split between two reactors. Alternatively, a loop reactor is preferred.

The polymer solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. Under certain conditions of temperature and pressure, the polymer solution can phase separate into a polymer lean phase and a polymer rich phase. Phase separation occurs at the lower critical solution temperature (LCST). Increasing the temperature or decreasing the pressure at the LCST point leads to further phase separation.

A polymer can be recovered from the effluent of either reactor or the combined effluent, by separating the polymer from other constituents of the effluent. Conventional separation means may be employed. For example, polymer can be recovered from effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned.

Preferably, the propylene-alpha olefin copolymer described herein is produced in either batch or continuous multistage polymerization processes. Each polymerization stage is defined as a single polymerization reactor or a polymerization zone within a single reactor. More specifically, a multistage polymerization may involve either two or more sequential polymerizations (also referred to as a series process) or two or more parallel polymerizations (also referred to herein as a "parallel process"). Preferably, the polymerization is conducted in a parallel process.

Each component of the propylene-alpha olefin copolymer made in the respective reactors of the continuous, multiple reactor solution process are blended in solution without prior isolation from the solvent. The blends may be a result of series reactor operation, where at least part of the effluent of a first reactor enters a second reactor and where the effluent of the second reactor can be submitted to finishing steps involving devolatilization. The blend may also be the result of parallel reactor operation where the effluents of both reactors are combined and submitted to finishing steps. Either option provides an intimate admixture of the polymers in the devolatilized copolymers. Either case permits a wide variety of polysplits to be prepared whereby the proportion of the amounts of each component produced in the respective reactors can be varied widely.

Preferably, the propylene-alpha olefin copolymer is a reactor blend. The method discussed herein has the advantage of eliminating the need for a melt blending operation and enables intimate blends of the copolymers to be made in the original reaction medium. Such materials have unique properties because they are not subjected to shear degradation in melt processing equipment. The degree of mixing of each component of the blend is more intimate.

Disclosed herein are continuous processes for making the propylene-alpha olefin copolymer. The process comprises contacting monomers including ethylene and propylene with a catalyst system in a first polymerization zone, thereby forming a mixture that includes the propylene copolymers, said propylene copolymer having a reactivity ratio product of less than 0.75 and a weight average molecular weight of greater than about 450,000 g/mol; polymerizing in a second polymerization zone by contacting a second monomer system and a second catalyst system capable of providing propylene copolymer, said propylene copolymer preferably having a reactivity ratio product of greater than 1.5 and a weight average molecular weight of less than about 215,000 g/mol. Preferably the said second catalyst is different from the first catalyst system.

In one example of a parallel process, two reactors are configured such that monomers, catalyst(s) and solvent are fed independently to each reactor. The first and second polymerizations are preferably taking place simultaneously in a parallel process.

The molecular weight characteristics (e.g., Mw, Mn, etc.) of the propylene-alpha olefin copolymer and also of the individual-propylene copolymer components can in certain circumstances be adjusted depending upon the desired properties of the propylene-alpha olefin copolymer. Those molecular weight characteristics are described elsewhere herein. For example, the molecular weight characteristics of each polymer can be set by choosing the reactor temperature, monomer concentration, and by optionally adding chain transfer agents such as hydrogen. Also, molecular weight can generally be lowered by increasing reaction temperatures, and raised by increasing monomer concentrations.

The propylene-alpha olefin copolymer may be used to prepare nonwoven elastic articles. The nonwoven products described above may be used in articles such as hygiene products, including, but not limited to, diapers, feminine care products, and adult incontinent products. The nonwoven products may also be used in medical products such as a sterile wrap, isolation gowns, operating room gowns, surgical gowns, surgical drapes, first aid dressings, and other disposable items. In particular, the nonwoven products may be useful as facing layers for medical gowns, and allow for extensibility in the elbow area of the gown. The nonwoven products may also be useful in disposable protective clothing, and may add toughness to elbow and knee regions of such clothing. The nonwoven products may also be useful as protective wrapping, packaging, or wound care. The nonwoven products may also be useful in geotextile applications, as the fabric may have improved puncture resistance in that the fabric will deform instead of puncture. See U.S. Patent Publication No. 2011/81529 and U.S. Pat. No. 7,319,077. The propylene olefin copolymer may also be suitable for use in an elastic films, as described in U.S. Pat. No. 6,500,563; blow films, as described in U.S. Patent Publication No. 2009/94027; and cast-films, as described in U.S. Pat. No. 7,655,317.

The propylene-alpha olefin copolymer has suitable elastic properties for use in nonwoven articles, including low tension set, top load, and hysteresis. The method of measurement for evaluating these elastic properties is described in the Examples section below. In an embodiment, the tension set of the copolymer is less than about 20%, preferably less than about 15%, most preferably less than about 12%. In an embodiment, the top load of the copolymer is less than about 15 N, preferably less than about 10 N, most preferably less than about 7 N. In an embodiment, the hysteresis of the copolymer is less than about 45%, preferably less than about 40%, most preferably less than about 30%.

The disclosure will now be more particularly described with reference to the following Examples.

EXAMPLES

Comparative Example 1 (CE1)

CE1 is a reactor blended propylene-based elastomer where the major component has 16 wt % ethylene content and 3 MFR (Mw of 240,000 g/mol) and the minor component has 4 wt % ethylene and 8 MFR (Mw of 195,000 g/mol). Both the first and second components of CE1 have an r1r2 of about 0.8 to about 0.9. CE1 is made in a reactor using C2-symmetric metallocene catalyst of dimethylsilyl bis(indenyl) hafnium dimethyl precursor activated by dimethylanilinium tetrakis(heptafluoronaphthyl) borate. CE1 was selected as the comparable example for its good elasticity.

Example 1 (E1)

Example 1 is a blocky propylene-ethylene elastomer with 16 wt % ethylene content. It is made in a 0.15 liter continuous reactor using C2-symmetric dimethyl(t-dimethylsilyl)bis(2-methyl-4-naphthylindenyl) zirconium precursor activated by dimethylanilinium tetrakis(heptafluoronaphthyl) borate. Polymerization experiments were performed in a continuous stirred tank reactor (CSTR) made by Autoclave Engineers, Erie Pa. The reactor was designed to operate at a maximum pressure and temperature of 2000 bar (30 kpsi) and 225° C., although the current experiments the nominal reactor pressures were lower, from 1600 to 1700 psig. The nominal reactor vessel volume was 150 mL. The reactor was equipped with a magnetically coupled stirrer drive (Magnedrive). A pressure transducer measured the pressure in the reactor. The reactor temperature was measured using a type-K thermocouple. A flush-mounted rupture disk located on the side of the reactor provided protection against catastrophic pressure failure. All product lines were heated to ~120° C. to prevent fouling. The reactor had an electric heating band that was controlled by a programmable logic control device. Except for the heat losses to the environment, the reactor did not have cooling (close to adiabatic operations).

The conversion in the reactor was monitored by an on-line gas chromatograph (GC) that sampled both the feed and the effluent. The GC analysis utilized the propane impurity present in the propylene feed as internal standard. The reactor temperature and the temperature difference across the reactor wall was maintained constant by adjusting the reactor heater output (skin temperature) and the catalyst feed rate. At low catalyst concentrations condition, impurity control was the most critical factor in achieving controlled, steady state reactor conditions. Feed purification traps were used to control impurities carried by the monomer feed. The purification traps were placed right before the feed pumps and comprised of two separate beds in series: activated copper (reduced in flowing $H_2$ at 225° C. and 1 bar) for $O_2$ removal followed by a molecular sieve (5 A, activated in flowing $N_2$ at 270° C.) for water removal.

Propylene was fed from a low-pressure cylinder equipped with a dip leg for liquid delivery to the reactor. A heating blanket (Ace) was used to increase the propylene cylinder head pressure to approx. 17 bar (~250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The purified monomer feed was fed by a two-barrel continuous ISCO pump (model 500D). The monomer flow rate was adjusted by adjusting the motor speed of the pump and was measured by a Coriolis mass flow meter (Model PROline Promass 80, Endress and Hauser).

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 110° C. and transferred hot to the antechamber of the dry box. Stock solutions of the catalyst precursor and the activator were prepared using purified toluene that was stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, N.J.) and was pressurized to 5 psig with argon. The activated catalyst solution was delivered to the unit by a custom made two-barrel continuous high-pressure syringe pump (PDC Machines).

HPLC grade hexane (95% n-hexane, J. T. Baker) was used as solvent. It was purged with nitrogen for a minimum of four hours then passed through a series of copper and mol sieve beds (similar to the ones used for the propylene feed, see above) and finally was filtered once over activated basic alumina. The filtered hexane was stored in a 4-liter glass vessel (Ace Glass, Vineland, N.J.) inside an argon-filled dry box. The hexane was further purified by adding 1.5 mL (1.05 g) of trioctylaluminum solution (Aldrich #38,655-3) to the 4-liter reservoir of filtered hexane. 5-10 psig head pressure of argon was applied to the glass vessel to deliver the scavenger-treated solvent to a metal feed vessel from which the hexane was delivered to the reactor by a two-barrel continuous ISCO pump (model 500D). 5-10 psig head pressure of argon was applied to the glass vessel to deliver the scavenger solution to a 500 mL single-barrel ISCO pump, which in turn fed diene to the reactor. Polymerization grade ethylene was compressed by a Fluitron A %-200 compressor and metered by a mass flow meter into the reactor.

During a polymerization experiment, the reactor was preheated to ~10-15° C. below that of the desired reaction temperature, ranging from 85 to 89° C. Once the reactor reached the preheat temperature, the solvent pump was turned on to deliver hexane/trioctylaluminum scavenger solution to the reactor from the 4-liter scavenger solution feed vessel. This stream of scavenger/catalyst solution entered the reactor through a port on the top of the stirrer assembly to keep the polymer from fouling the stirrer drive. After the flow of solvent to the reactor was verified by monitoring the amount of solvent taken from the feed vessel, the monomer feeds were turned on. The monomers were fed to the reactor through a side port. 22 wt % propylene and 15 wt % ethylene in solvent were fed into the reactor. The reactor was purged when the pressure increased to ~100 bar (~1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (~400 psi) an air actuated solenoid valve was opened to allow the catalyst solution to mix with the stream of flowing solvent upstream of the reactor. The arrival of the catalyst to the reactor was indicated by an increase in the reaction temperature caused by the exothermic polymerization reaction. During the line-out period, the catalyst feed rate was adjusted to reach and maintain the target reaction temperature and conversion. The residence time was 12.7 min. The products were collected and weighed after vacuum-drying overnight at 70° C. Aliquots of the product were used for characterization without homogenizing the entire product yield.

Example 2 (E2)

Example 2 is the high molecular weight alternating propylene-ethylene elastomer with 15.7 wt % ethylene content made using C1 symmetric 2,6-diisopropyl-N-((6-(2-((o-tolylamido)methyl)naphthalen-1-yl)pyridin-2-yl)methyl)anilidohafnium dimethyl precursor activated by dimethylanilinium tetrakis (pentafluorophenyl) borate. Polymerizations were carried out in a continuous stirred tank reactor system. A 0.5-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. All feeds (solvent and monomers) were pumped into the reactors by Pulsa feed pumps and the flow rates were controlled using Coriolis mass flow controller (Quantim series from Brooks) except for the ethylene, which flowed as a gas under its own pressure through a Brooks flow controller. Similarly, H2 feed was controlled using a Brooks flow controller. Ethylene, H2 and propylene feeds were combined into one stream and then mixed with a pre-chilled isohexane stream that had been cooled to at least 0° C. The mixture was then fed to the reactor through a single line. Scavenger solution was added to the combined solvent and monomer stream just before it entered the reactor to further reduce any catalyst poisons. Similarly, catalyst solution was fed to the reactor using an ISCO syringe pump through a separated line.

Isohexane (used as solvent), and monomers (e.g., ethylene and propylene) were purified over beds of alumina and molecular sieves. Toluene for preparing catalyst solutions was purified by the same technique. An isohexane solution of tri-n-octyl aluminum (TNOA) (25 wt % in hexane, Sigma Aldrich) was used as scavenger solution. 2,6-diisopropyl-N-((6-(2-((o-tolylamido)methyl)naphthalen-1-yl)pyridin-2-yl)methyl)anilidohafnium dimethyl was activated with N,N-dimethyl anilinium tetrakis (pentafluorophenyl) borate at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The scavenger feed rate was adjusted to optimize the catalyst efficiency and the feed rate varied from 0 (no scavenger) to 15 μmol/min. The catalyst feed rates may also be adjusted according to the level of impurities in the system to reach the targeted conversions listed. All the reactions were carried out at a pressure of about 2.4 MPa/g unless otherwise mentioned. The reaction was carried out at a temperature of 70° C., propylene feed rate of 14 g/min, an ethylene feed rate of 0.9 g/min, $H_2$ feed rate of 3.62 cc/min (H2 was diluted in N2 at a concentration of 24 vol % of $H_2$), and isohexane feed rate of 56.7 g/min. The overall conversion was 32.9 wt %.

Characterization of CE1, E1 and E2

Molecular weights, molecular weight distributions, and compositions were measured using GPC-IR (or GPC-4D) whereas sequence distributions and compositions were determined by C13 NMR. Crystallinity was identified by wide x-angle x-ray scattering of aged (more than 7 days) compression molded films. Thermal properties were evaluated using DSC (Differential Scanning Calorimetry).

As shown in the Table 1, CE1, E1, and E2 samples have similar crystallizable sequence lengths, similar crystallinity, and similar molecular weights. However, due to their differences in the r1r2, each requires a different amount of ethylene to achieve the same final crystallinity (E2 has the highest r1r2 and the lowest ethylene content of the inventive propylene-ethylene elastomers, and E1 has the lowest r1r2 and the highest ethylene content). Tg values reflect the ethylene content—samples with higher ethylene content have lower Tg values. The individual reactor components of CE1 are reported in Table 1.

Elastic Properties of E1 and E2

A Fontijne melt vacuum press was used to mold a 2 mm thick plaque of each sample. The temperature was ramped up to 190° C. and held for 5 minutes followed by 5 minutes under compression before cooling to room temperature. ASTM type 3 dog bones are punched out using a clicker press in L210. The sample was aged for a minimum of 7 days after molding before mechanical test. The time is required for the pellet unstable samples to slowly crystallize so to arrive at their final crystallinity. It is critical for the sample to develop its full crystallinity so that consistent and reproducible mechanical testing can be conducted. An Instron tensile tester was used for the mechanical tests. The sample was placed in the grips with a 35-mm grip separation. Slack was manually removed so that the reading on the instrument registers a positive tensile force before starting the test. The sample is stretched to a 100% extension at 100 mm/min. The crosshead returns to 0% extension and repeats this cycle once more.

The elasticity values, top load, set, hysteresis, averaged over measurements done from at least three specimens, can be found in Table 2 during the first and second cycles of loading. Comparing elastic properties of E1 and E2 shows that blocky E1 has favorably lower set, top load, and hysteresis and higher retractive force. E1 had the higher top load, as compared to E2, which is not desirable. E2 had better elastic properties due to its high molecular weight, however E2 is not pellet stable (extremely low crystallinity) and is difficult to process as a result of its high viscosity (reflected by its high molecular weight in Table 1).

TABLE 2

ELASTIC PROPERTIES

| Sample | $1^{st}$ set (%) | Top load (N) | Retractive Force (N) | Hysteresis (%) | 2nd set (%) | $2^{nd}$ top load (N) | $2^{nd}$ retractive | $2^{nd}$ hysteresis (%) |
|---|---|---|---|---|---|---|---|---|
| E1 | 10.5 | 15.7 | 8.8 | 36.0 | 4.2 | 9.8 | 8.3 | 12.0 |
| E2 | 10.0 | 5.0 | 3.7 | 18.8 | 3.7 | 4.1 | 3.4 | 10.4 |

Blending of E1 and E2, Comparing to CE1

Two blends—a 90 wt % E2 and 10 wt % E1 blend and an 80 wt % E2 and 20 wt % E1 blend were each solution blended in xylene at 130° C. 90/10 and 80/20 blend ratios were designed to ensure that both E1 and E2 are co-continuous in the final blends in accordance to their viscosity ratio. However, due to the lack of the electron contrast (for electron microscopy) and the lack of mechanical contrast (for atomic force microscopy), one cannot easily determine their co-continuity although their elastic properties should reflect their co-continuity blend morphology. The resulting blends were then compression molded using a Fontijne melt vacuum press and aged for a minimum of 7 days after molding before the mechanical test. The elastic properties of these blends are reported in Table 3 and the loading. The set, top load, retractive force and hysteresis values of these blends appear to indicate co-continuity and these blends are pellet stable with relatively fast crystallization.

TABLE 1

COMPOSITIONAL CHARACTERIZATION RESULTS

| | C2 wt % | MFR g/10 min | Mw kg/mol | PDI | r1r2 | % mm | x-ray crystal[2] | Tg ° C. | Pellet Stable[3] |
|---|---|---|---|---|---|---|---|---|---|
| CE1 (90/10) | 14.7 (16/4) | 3.0 (3/8) | 248 (241/195) | 1.70 | 0.85 (0.8-0.9/0.8-0.9) | 88.5 | 10.0% | −27.7 | Yes |
| E1 | 16.4 | 18.1 | 143 | 2.18 | 2.51 | 100 | 16.1% | −31.7 | Yes |
| E2 | 15.7 | <1 | 524 | 2.07 | 0.59 | | 2.9% | | No |

1Crystallizable sequence
[2]Crystallinity determined by x-ray after aging for a minimum of 7 days
[3]Pellet stability determined by the presence of Tc (crystallization temperature) during DSC cooling at 10° C./min.

TABLE 3

| | | | Retractive | | 2nd | 2nd | | 2nd |
| Example | 1st set (%) | Top load (N) | Force (N) | Hysteresis (%) | set (%) | Top load (N) | 2nd Retractive | Hysteresis (%) |
| --- | --- | --- | --- | --- | --- | --- | --- | --- |
| 1 (90/10) | 10.8 | 5.6 | 3.9 | 22.6 | 4.3 | 4.3 | 3.7 | 11.0 |
| 2 (80/20) | 9.4 | 7.0 | 4.8 | 24.7 | 3.2 | 5.4 | 4.5 | 10.5 |
| CE1 | 13.0 | 11.5 | 6.6 | 36.7 | 4.9 | 7.8 | 6.0 | 14.5 |

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition comprising
   (a) from about 60 wt % to about 95 wt % of a first propylene alpha-olefin copolymer component having a reactivity ratio product of less than 0.75 and a weight average molecular weight of greater than about 450,000 g/mol; and
   (b) from about 5 wt % to about 40 wt % of a second propylene-alpha olefin copolymer component having a reactivity ratio product of greater than 1.5 and a weight average molecular weight of less than about 215,000 g/mol;
   wherein the composition has at least one of the following properties:
   (i) a tension set of less than about 12%;
   (ii) a top load of less than about 7 N; or
   (iii) a hysteresis of less than about 30%.

2. The composition of claim 1, having:
   (i) a tension set of less than about 12%;
   (ii) a top load of less than about 7 N; and
   (iii) a hysteresis of less than about 30%.

3. The composition of claim 1, wherein the alpha-olefin of the first component is ethylene and the alpha-olefin of the second component is ethylene.

4. A personal hygiene material, packaging material, or film, comprising the composition according to claim 1.

* * * * *